R. A. PLUMB, W. S. SEYMOUR & C. R. WEED.
COMPOSITION BOARD FORMING MACHINE.
APPLICATION FILED APR. 16, 1917.
1,236,006.  
Patented Aug. 7, 1917.
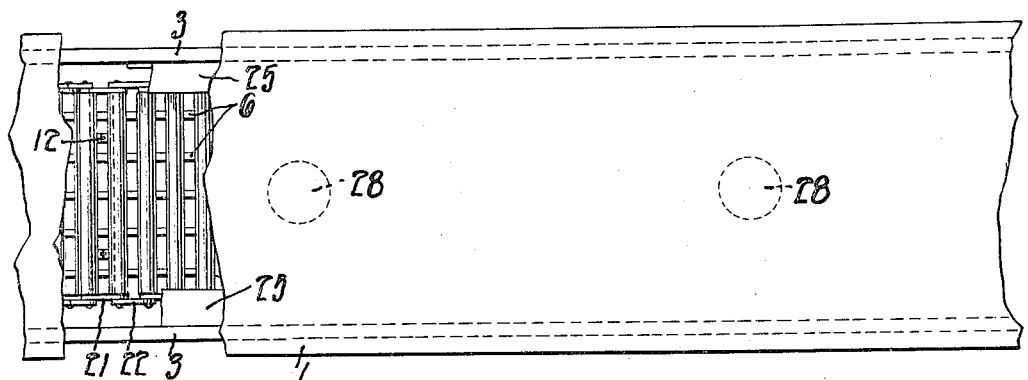
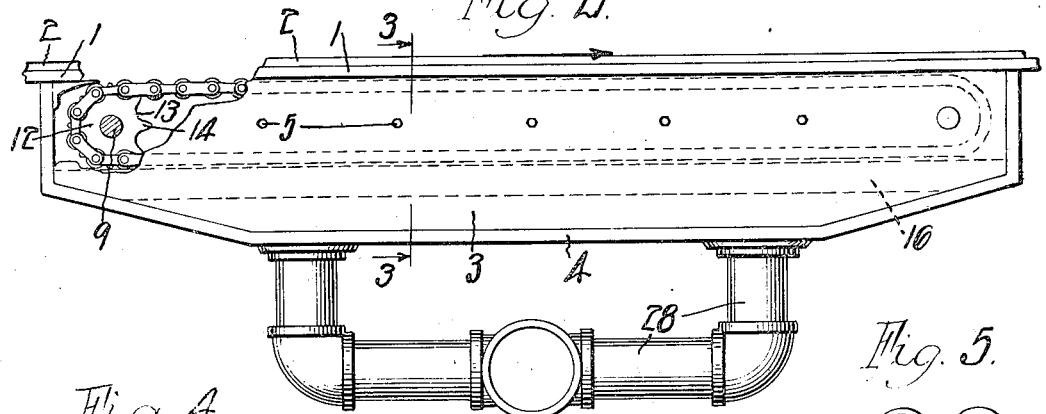
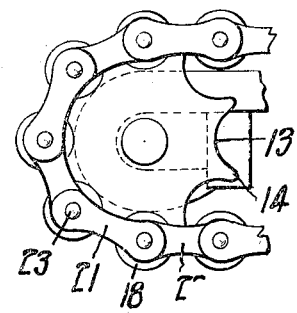
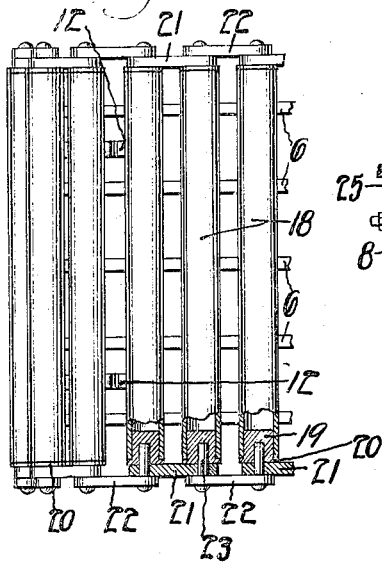
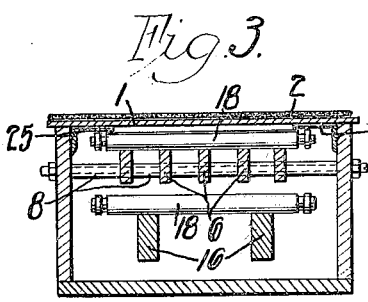
Inventor  
Roy A. Plumb,  
William S. Seymour,  
By Clarence R. Weed,  
Attorneys

UNITED STATES PATENT OFFICE.

ROY ALFRED PLUMB, WILLIAM S. SEYMOUR, AND CLARENCE R. WEED, OF DETROIT, MICHIGAN, ASSIGNORS TO TRUSSED CONCRETE STEEL COMPANY, OF DETROIT, MICHIGAN, A CORPORATION OF MICHIGAN.

COMPOSITION-BOARD-FORMING MACHINE.

1,236,006.           Specification of Letters Patent.      Patented Aug. 7, 1917.

Application filed April 16, 1917. Serial No. 162,284.

*To all whom it may concern:*

Be it known that we, ROY ALFRED PLUMB, WILLIAM S. SEYMOUR, and CLARENCE R. WEED, all citizens of the United States, and residents of Detroit, in the county of Wayne and State of Michigan, have invented a new and useful Composition-Board-Forming Machine, of which the following is a specification.

The present invention relates to a machine for forming a refractory composition board (from fibrous, preferably fireproof, and cementitious materials) suitable for use on roofs, sidings, and for protective purposes generally. One example of these machines is set forth in United States Letters Patent Number 1,220,550 dated March 27, 1917, and the present invention resides in certain improvements in the suction box shown therein. It will be understood, however, that these improvements are applicable to machines the construction of which differs widely from that actually shown in the above patent so long as the essential features broadly considered, are included—in other words, to a composition board forming machines that include a moving belt upon which a wet sheet of the proper materials is fed, together with some means for exerting pressure upon the sheet while it is still on the belt. Neither the feeding nor the pressing means is shown in the present case.

The suction box shown in the above mentioned patent includes an endless slat carrier upon which the material carrying belt is supported, but these carriers are objectionable for the reason that they offer considerable resistance to the movement of the belt (which results in stretching of the latter) and also because the suction is applied to the belt only in the spaces between the slats, that is to say, not uniformly.

To the end of overcoming the objections stated and thus rendering practical the production of refractory composition board on a large scale by a continuous process, the present invention consists in a suction box of the character stated in which the endless material-carrying belt is supported, while passing over the suction box, upon an endless chain or belt of rollers, the rollers themselves being arranged to bear upon a track and to rotate about their own axes during the forward movement of the chain. It follows that the forward bodily movement of the rollers, at least in the preferred construction wherein the rollers are driven by the material-carrying belt, is substantially one half as fast as that of the latter; in other words, that although the elements of the rollers in contact with the lower surface of the belt at a given instant travel forwardly at the same speed as the belt, the actual forward speed of the belt is substantially twice that of the rollers as a whole. It is, of course, recognized that by varying the relation of tracks and rollers slightly, for example, by grooving the rollers to receive the tracks, the relative forward speeds of the material-carrying belt and the rollers might be varied. The fact that a difference in the forward speeds of the belt and rollers may be secured is of great practical value, since the suction is thus applied uniformly to the belt in the course of its movement, and also because comparatively little friction is thereby offered to the belt while suction is being applied, which relieves the belt from stretching.

Another feature of the invention consists in means for maintaining proper alinement of the rollers transversely of the suction box. The invention further consists in the details of construction shown, described and claimed.

In the drawings, Figure 1 is a plan view in the vicinity of the suction box, parts being broken away. Fig. 2 is a side elevation corresponding to Fig. 1. Fig. 3 is a section on the line 3—3 of Fig. 2. Fig. 4 is a fragmentary plan view on an enlarged scale, parts being broken away to show a preferred form of connection between the chain and the rollers. Fig. 5 is an enlarged view showing the curved ends of the track-forming members.

The material-carrying endless belt 1 is fed with a transverse sheet of a wet plastic or semi-liquid mixture 2 (preferably of asbestos or fiber and hydraulic cement) from suitable devices, not shown, and is drawn in the direction indicated by the arrows by suitable means, also not shown. The feeding devices are ordinarily chutes provided with suitable gages for causing the material to be fed in a sheet of uniform thickness across the greater part of the width of the belt. This material is too wet to allow the application of pressure requisite to form sheets of sufficient stiffness to allow handling. The belt is therefore made of a material such, for example, as felt, that while tight enough to retain fiber and cement, nevertheless allows water to be readily drawn therethrough to thus leave the ingredients in a sufficiently dry state to allow the application of heavy pressure at some later point in the movement of the belt.

The details of the suction box may vary within wide limits, but it is shown formed of the wooden sides 3 and bottom 4, the latter of which inclines upwardly at the ends as indicated in Fig. 2. The sides are prevented from bulging by the stiff cross bolts 5 that also pass through and form supports for the longitudinally extending track members 6, which are properly spaced in respect to the sides and to one another by the tubular sleeves 8.

At the rear end of the box is the cross-shaft 9 which passes through the ends of the track members 6 and is preferably supported solely by said members whereby any trouble from leakage of air such as might occur in case the shaft passed through the sides 3 is avoided. An obvious modification would be to mount the shaft in bearings on the inner faces of the sides of the box. The shaft 9 supports sprocket wheels 12, the depressions 13 between the teeth 14 of which are preferably formed substantially on circular arcs. Passing over the sprocket wheels and along the upper surfaces of the track members 6 in the direction indicated by the arrow (Fig. 2), and returning along the upper surfaces of track members 16 (Fig. 3) are a series of rollers 18. These rollers are preferably formed of seamless tubing (Fig. 4) the ends of which are closed by bearings or bushings 19 pressed into place. As shown, the bushings have flanges 20 whereby the distance which they may be pressed into the tubings is limited, thus facilitating assembling. The ends of the rollers are connected by chains which may be conveniently formed of links 21 alternating with links 22, the latter of which have rigid therewith pins 23 which pass through holes in the links 21 and project into the bores of the bushings 19. The construction of the chains may, of course, be widely varied. In order to protect the chains from such cement and other material as may be drawn through the belt, they are located just below the horizontal flanges of angle sections 25 that are secured to the upper inner edges of the sides 3. Both the front and rear faces of the track members 6 are preferably curved in circular arcs to afford an easy change of direction in the movement of the rollers.

A partial vacuum is maintained in the box by means of a suction apparatus acting through the pipes 28 that may be arranged in any suitable way. It will be observed that the return tracks are spaced from the bottom of the box to allow water to freely escape into the pipes.

In use, assuming that suction is applied to the box, the forwardly moving belt is drawn down tightly upon the rollers which carry substantially all the weight. The edges of the belt just outside of the rollers are also drawn down upon the smooth angle sections 25 which results in a fairly close seal. As the belt moves forward the rollers roll along the tracks at substantially half the speed of the belt, which results in the suction being applied uniformly to the belt throughout its entire length for the reason that the line of contact between the belt and a given roller is continually changing. The construction therefore not only does away very largely with friction but also results in a very much more efficient application of the suction than has been possible heretofore.

In accordance with the patent statutes we have described a preferred embodiment of the invention, but it is clear that the means for carrying the invention into use may be changed within wide limits. We do not, therefore, wish to be limited except as indicated by the claims.

We claim:—

1. Means for forming a refractory composition board from a wet mixture of fibrous material and hydraulic cement comprising a moving belt upon the upper surface of which a sheet of the wet mixture is carried, a suction box over which the belt passes, and a series of rollers movable bodily in the same direction as the belt upon which said belt rests as it passes over the suction box, whereby suction may be applied uniformly to the lower surface of the belt to withdraw excess moisture from the mixture.

2. Means for forming a refractory composition board from a wet mixture of fibrous material and hydraulic cement comprising a moving belt upon the upper surface of which a sheet of the wet mixture is carried, said belt being adapted to allow water to be sucked therethrough, a suction device over which the belt passes, and a series of rollers movable bodily in the same direction as the belt upon which said belt rests as it passes over the suction device, whereby suction may be applied to the lower surface of the belt to withdraw excess moisture from the mixture.

3. Means for forming a refractory composition board from a wet mixture of fibrous material and hydraulic cement comprising a moving belt upon the upper surface of which a sheet of the wet mixture is carried, a suction device over which the belt passes, and a series of rollers movable bodily along the line of movement of the belt and relatively to the belt, said belt resting upon the rollers as it passes over the suction box, whereby suction may be applied uniformly to the lower surface of the belt to withdraw excess moisture from the mixture.

4. In combination, a moving belt having a layer of wet fibrous material on its upper surface, a suction box over which the belt travels and for the top of which it constitutes a seal, and a series of rotatable rollers in the box upon which the central portion of the belt is carried, said rollers being movable bodily along the line of movement of the belt.

5. In combination, a moving belt having a layer of wet fibrous material on its upper surface, a suction box over which the belt travels and for the top of which it constitutes a seal, a series of rotatable rollers in the box upon which the central portion of the belt is carried, said rollers being movable bodily along the line of movement of the belt, and track forming means upon which said rollers are supported while supporting the belt.

6. In combination, a moving belt having a layer of wet fibrous material on its upper surface, a suction box over which the belt travels and for the top of which it constitutes a seal, and means in the box for supporting the central portion of the belt, said means being movable bodily along the box at a speed different from the speed of the belt whereby suction may be applied uniformly to the lower surface of the belt to withdraw excess moisture from the material said supporting means being driven by the belt.

7. In combination, a moving belt having a layer of wet fibrous material on its upper surface, a suction box over which the belt travels and for the top of which it constitutes a seal, a series of rotatable rollers in the box upon which the central portion of the belt is carried, said rollers being movable bodily along the line of movement of the belt, track forming means upon which said rollers are supported while supporting the belt, and means for maintaining proper alinement of the rollers as they pass along the track.

8. Means for forming a refractory composition board from a wet mixture of fibrous material and hydraulic cement comprising a moving belt upon which the upper surface of which a sheet of wet mixture may be supported, a suction box over which the belt passes and for the upper face of which the belt forms a seal, track forming means within the box, and an endless chain of rollers for supporting the central portion of the belt while passing over the box, said rollers traveling on said track forming means at a speed different from that of the belt, whereby suction may be applied uniformly to the belt to withdraw excess moisture from the mixture.

9. Means for forming a refractory composition board from a wet mixture of fibrous material and hydraulic cement comprising a moving belt upon which the upper surface of which a sheet of the wet mixture may be supported, a suction box over which the belt passes and for the upper face of which the belt forms a seal, track forming means within the box, a series of closely spaced rollers for supporting the central portion of the belt while passing over the box, said rollers traveling on said track forming means, the corresponding ends of the rollers being connected by endless chains, and means for protecting said chains from material which may be drawn through the belt by suction.

10. In combination, a suction box having a bottom, sides and ends, the upper edges of the sides and ends lying in the same plane, a series of rotatable rollers movable bodily along the box supported in the box with their upper surfaces lying substantially in the plane of the upper edges of the sides and ends, a belt passing over the upper face of the box in sealing relation to the upper face thereof, said belt being adapted to support a layer of wet fibrous material whereby excess moisture may be removed from the material.

11. In a suction box for supporting a moving belt upon which a layer of wet material is being carried, a track, a series of rollers supporting the belt and movable bodily along the track solely by said belt, whereby suction is allowed to be uniformly applied to the lower surface of the belt and whereby friction is largely avoided.

ROY ALFRED PLUMB.
WILLIAM S. SEYMOUR.
CLARENCE R. WEED.